United States Patent [19]

Kutsch

[11] 4,266,409
[45] May 12, 1981

[54] ENERGY-ABSORBING TORQUE TRANSMITTER

[75] Inventor: Howard J. Kutsch, Wilmington, Del.

[73] Assignee: E. I. Du Pont de Nemours and Company, Wilmington, Del.

[21] Appl. No.: 13,193

[22] Filed: Feb. 16, 1979

[51] Int. Cl.³ ............................................... F16D 3/58
[52] U.S. Cl. ......................................................... 64/12
[58] Field of Search ...................................... 64/12, 19

[56] References Cited

U.S. PATENT DOCUMENTS

| | | | |
|---|---|---|---|
| 643,081 | 2/1900 | Bullock | 64/12 |
| 703,582 | 7/1902 | Hicks, Jr. | 64/12 |
| 989,064 | 4/1911 | Schmalzried | 64/12 |
| 1,522,980 | 1/1925 | Roco et al. | 64/12 X |
| 1,591,242 | 7/1926 | Simpson | 64/12 |
| 2,778,663 | 1/1957 | Prevost | 64/12 |
| 2,858,855 | 11/1958 | Picanol | 64/12 X |
| 3,766,146 | 10/1973 | Witsiepe | 528/301 |
| 4,012,962 | 3/1977 | Ballou et al. | 74/233 |
| 4,128,698 | 12/1978 | Anolick | 428/480 |
| 4,136,715 | 1/1979 | McCormack | 138/130 |

FOREIGN PATENT DOCUMENTS 89078  8/1960  Denmark ................................. 64/12

*Primary Examiner*—Henry K. Artis

[57] ABSTRACT

An energy-absorbing torque transmitter comprising a hub member and rim member, one of which is connected to an output shaft, the other to an input shaft, the hub member having at least two hub rollers mounted thereon, the rim member of larger diameter having a plurality of rim rollers mounted thereon, said hub and rim members being operatively connected by at least one belt of an oriented copolyetherester elastomer trained over hub and rim rollers, said belt capable of being stretched by up to about 60% of its original length upon application of force to either shaft to permit relative rotation of said hub member with respect to said rim member so that torque is transferred from one shaft to the other through said belt.

11 Claims, 8 Drawing Figures

ENERGY-ABSORBING TORQUE TRANSMITTER

BACKGROUND OF THE INVENTION

Various types of couplings and other torque transmitters have been used in many applications for connecting input and output shafts. Generally, such devices have been substantially locked as the two shafts rotate, such that torsional vibrations or shocks on the input or output shafts are transmitted to the other shaft, many times with amplification, as well as to other component parts of the apparatus. The present invention is directed to an energy-absorbing torque transmitter that is a cushioning device, that is, a torsional shock absorber and, therefore, torsional vibrations are largely absorbed and not substantially transmitted from one shaft to the other. For example, in automotive vehicles that make use of an automatic transmission it may be desirable to include a lock-up clutch to directly couple engine drive shaft to transmission input shaft when the vehicle reaches a certain speed. Its purpose is to eliminate fuel losses related to torque converter slip. If the shafts are rigidly locked by this clutch, torsional vibrations or shocks on either shaft are transmitted to the other as well as to the rest of the vehicle and its occupants. A torque cushioning device within the clutch is therefore desirable. Such a torque cushion must handle full engine torque, and any fractional part thereof, plus and minus the torsional vibrations derived from cyclic engine firing and other changes in demand load by the wheels. The softer the cushion the lower will be its natural frequency, and the better it will be for shock and vibration damping.

Compression spring systems have been used for the torque cushioning portion of the lock-up clutch in an automotive vehicle, but their very presence, i.e., the space they occupy, plus their necessary push rods, severely limits the amount of differential rotation permitted between the two shafts. Such systems are hard cushions with correspondingly high natural frequencies of vibration and, therefore, they perform poorly in response to sudden power surges and do little toward the damping of external vibrations.

The present invention is particularly suitable for use in automatic transmissions in automotive vehicles since it provides a means for substantially eliminating vibrations and shock due to power surges from the engine, misfires and sudden changes in demand load for propulsion. In an automatic transmission the present invention provides for substantially eliminating fluid slip in the torque converter. Fluid slip results in energy loss, and thence, in heat buildup and excess fuel consumption. Thus the present invention, when used in automotive vehicles equipped with automatic transmissions, can result in substantially lower fuel consumption. Also, the apparatus described herein, when used as an energy-absorbing torque cushion, offers a lower natural frequency of vibration compared to metal spring system farther removed from the range of frequencies associated with automotive engines, drive shaft, gear and the like and, therefore, results in a smoother riding vehicle. Although the apparatus of the present invention will be described primarily in relation to a lock-up clutch in an automatic transmission for an automotive vehicle it can be used in other applications.

SUMMARY OF THE INVENTION

The present invention is directed to an energy-absorbing torque transmitter comprising a hub member and a rim member, one of which is connected to an output shaft, the other to an input shaft, the hub member having at least two hub rollers mounted thereon, the rim member of larger diameter having a plurality of rim rollers mounted thereon, said hub and rim members being operatively connected by at least one belt of an oriented copolyetherester elastomer trained over hub and rim rollers, said belt capable of being stretched by up to about 60% of its original length upon application of force to either shaft to permit relative rotation of said hub member with respect to said rim member so that torque is transferred from one shaft to the other through said belt.

The oriented elastomeric belt can be stretched in the energy-absorbing torque transmitter from about 2–60% of its original length, and usually for most applications 5–30%, when force is applied. The belt returns to substantially its original length when force is removed. A single belt can be used connecting all the rollers, or a plurality of belts can be used to connect the hub rollers and rim rollers. The belt can be an endless belt or merely a strap having two free ends. Preferably, the belt is a composite wherein layers of oriented copolyetherester elastomer are substantially encapsulated within a lower melting point copolyetherester elastomer. Most importantly, the belt functions as a torque cushioning device on the sudden application of forces which result in relative rotation between hub member and rim member as from the sudden lock-up of a torque converter lock-up clutch. The elastomeric belt is stretched just enough to handle the current torque requirement and returns substantially to its original length when force is removed. When used in an automatic transmission system the transmission fluid present in the housing of the torque converter does not cause appreciable deterioration of the oriented copolyetherester belt at operating temperatures under cyclic strain.

Preferably, the hub member is an inner rotor with spaced radially disposed walls between which hub rollers are mounted, the hub rollers being on shafts mounted in the walls. Preferably, the rim member is an outer rotor with spaced, inwardly projecting walls aligned with the walls of the inner rotor and rim rollers are mounted between the walls on shafts mounted in the walls.

Optionally, a plurality of guide rollers can be mounted on said rim member and radially off-set from rim rollers to allow use of a longer belt, thereby lowering the relative extension of the elastomeric belt for a given relative rotation of the hub and rim member. Also, to provide reverse characteristics different from forward characteristics of the energy-absorbing torque transmitter a plurality of push rollers can be mounted on said hub member outwardly of the hub roller and adjacent or in contact with the copolyetherester elastomer belt that joins a hub roller to a rim roller. These push rollers are aligned substantially radially with the rim roller.

The apparatus of the present invention is especially suitable for use as a torque cushion ahead of the gears in an automotive transmission to operatively and softly connect the transmission shaft directly to the engine drive shaft, coincidentally locking out the functionality of the torque converter or fluid coupling which might otherwise be involved.

BRIEF DESCRIPTION OF THE DRAWINGS

FIG. 1-B is a schematic sectional side view of the apparatus of FIG. 1-A through lines 1B—1B of FIG. 1-A.

FIGS. 1-C to 6 are schematic illustrations of the apparatus shown in FIGS. 1-A and 1-B and modifications thereof showing the arrangement of cooperating parts.

DETAILED DESCRIPTION OF THE PREFERRED EMBODIMENTS

The torque transmitter apparatus of this invention will be better understood with reference to the detailed description and the accompanying drawing.

Figure 1B:
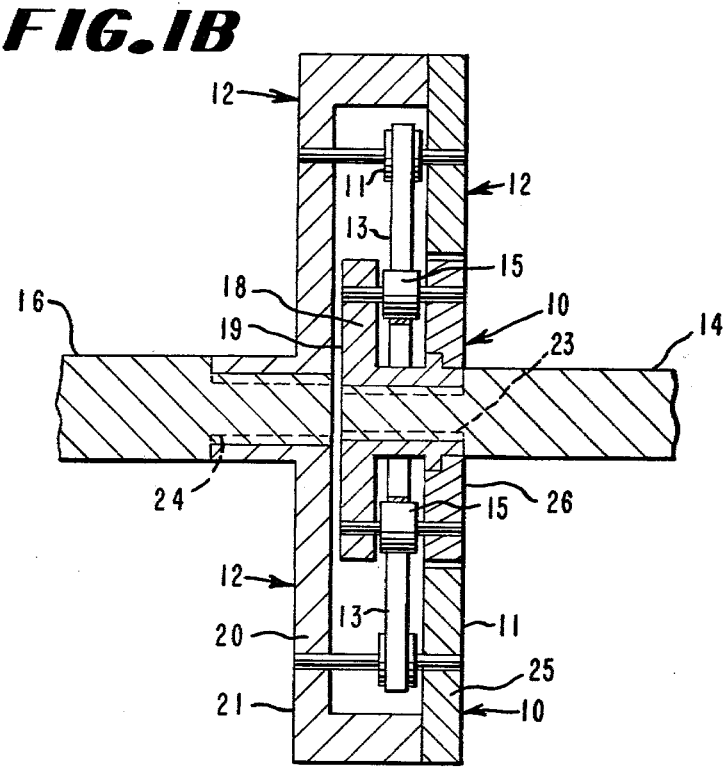
FIG. 1-A is a schematic face view of the energy-absorbing torque transmitter of the present invention with the cover plate removed.
Figure 1A:
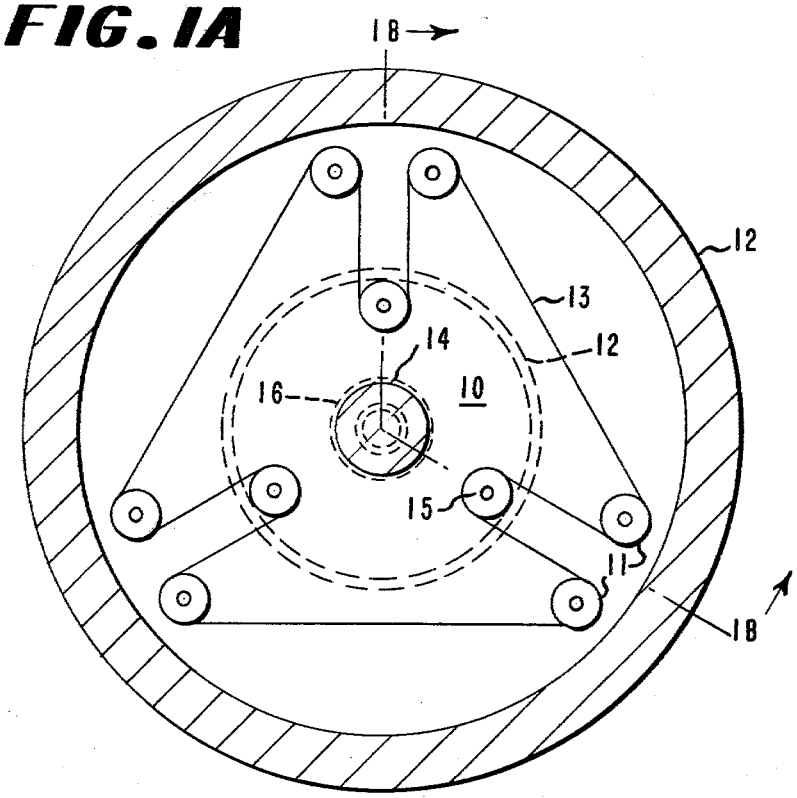
Figure 1C:
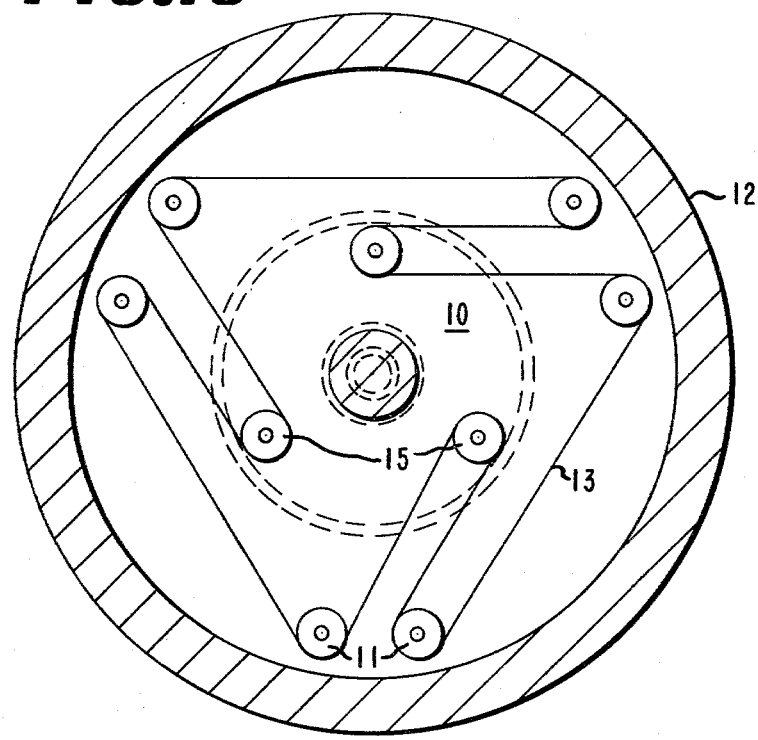
Figure 2:
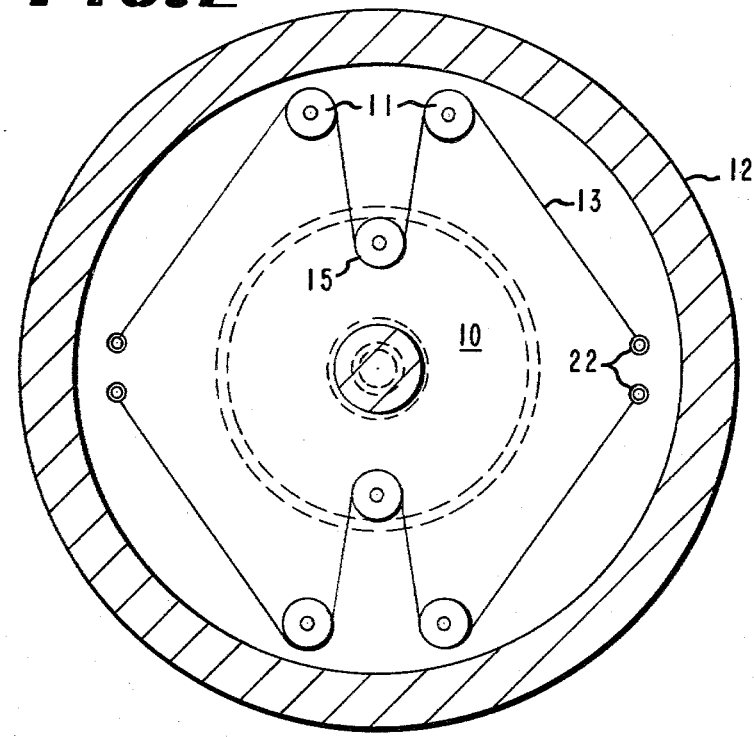
Figure 6:
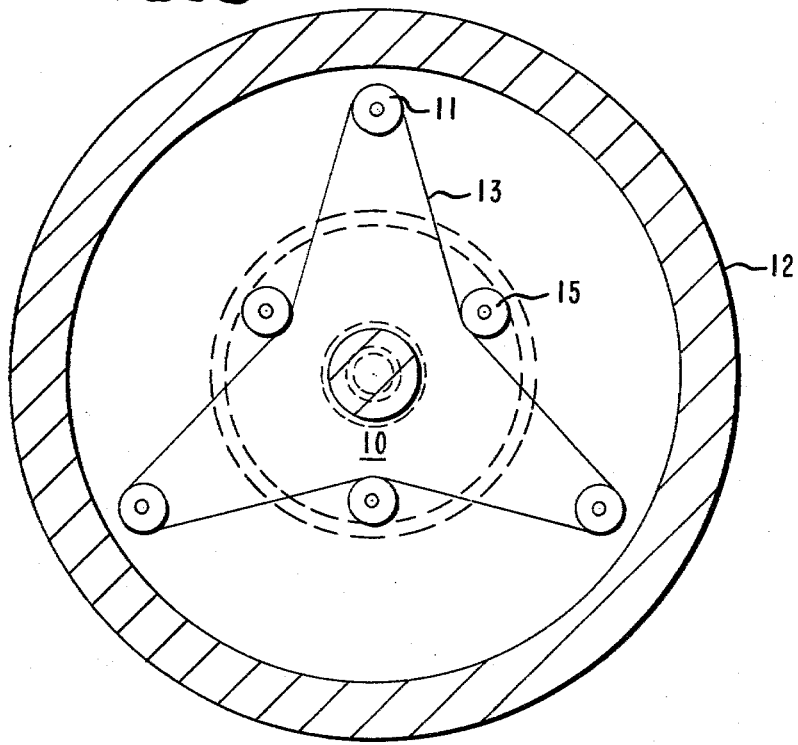

Reference is made to the drawing, especially FIGS. 1-A and 1-B, wherein hub member 10 is adapted to be coupled by spline 23 to one end of a shaft, which will be assumed to be a driven shaft or output shaft 14, such as in an automobile, the torque converter output or transmission input shaft. Rim member 12 is adapted to be coupled by spline 24 to one end of a second shaft, which will be considered the driving shaft or input shaft 16, such as the engine output or torque converter input shaft. It is understood that it is immaterial whether the hub member or rim member is employed as the driver. The rim member 12 of larger diameter than hub member 10 has a plurality of rim rollers 11, preferably in pairs, mounted on walls 21 of rim member 12 near the circumference. More specifically, said rim member 12 comprises an outer rotor 20 with spaced inwardly projecting walls 21 between which rim rollers 11 are mounted, one of the walls of outer rotor 20 being rim cover plate 25. A plurality of hub rollers 15 are mounted on hub member 10. More specifically, hub member 10 comprises an inner rotor 18 with spaced radially disposed walls 19 between which hub rollers 15 are mounted, one of the walls of inner rotor 18 being hub cover plate 26. The hub and rim rollers preferably are pulleys that are rotatable with stretch of the elastomeric belt, but the pulleys can be fixed and the elastomeric belt can slide over them. FIG. 1-C is illustrative of the high belt stretch occurring on differential rotation of hub to rim in the device of FIG. 1-A. The torque transmitter has at least two hub rollers 15 mounted on hub member 10 and a plurality of rim rollers 11 on rim member 12. Preferred embodiments require that the hub member have at least two hub rollers and the rim member have at least two pairs of rim rollers, or twice as many rim rollers as hub rollers, as illustrated in FIG. 2. Alternatively, hub member 10 and rim member 12 can have the same number of rollers, as shown, for example, in FIG. 6, where hub rollers share their rim roller pair with the adjacent hub roller so that the torque converter has one rim roller for each hub roller. Preferably, rim and hub rollers form triangular arrangements with each other, usually an isosceles triangle in the neutral or resting position, and the number of rim rollers is twice the number of hub rollers. The rollers are circumferentially arranged around the common axis of hub and rim members with rim rollers 11 on a larger circle than hub rollers 15. Copolyetherester elastomer belt 13 that is trained over rim rollers 11 and hub roller 15 can be a single endless belt as in FIG. 1, or a plurality of endless belts, as in FIG. 3, or a plurality of straps fastened to rim member 12 by pins 22 as shown in FIG. 2.

Figure 4:
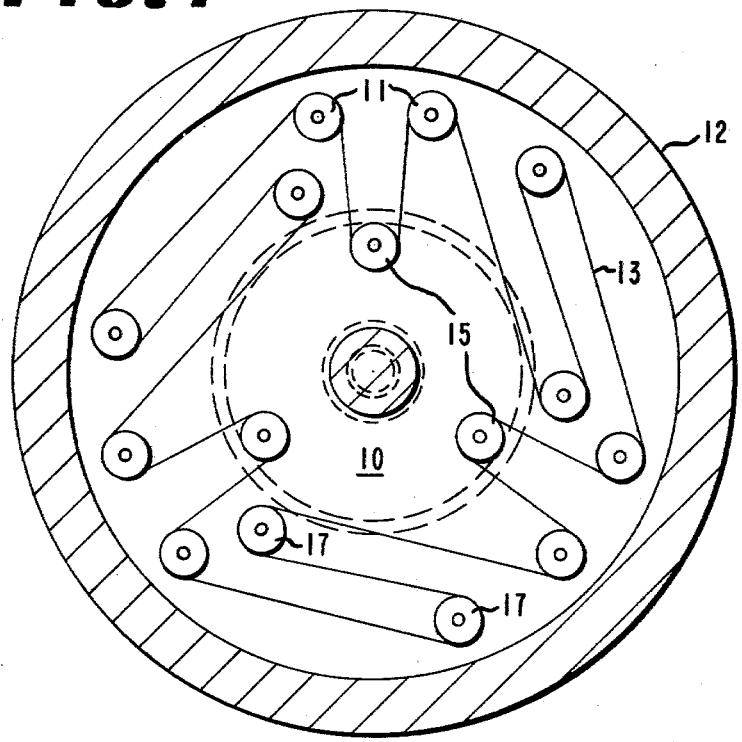

As illustrated in FIG. 4, optionally, to substantially lower the relative extension of oriented copolyetherester elastomer belt 13 of the energy-absorbing torque transmitter for a given degree of rotation, guide rollers 17 are mounted on the rim member 12 and radially off-set from rim rollers 11 so as to increase the neutral or at-rest length of thermoplastic copolyetherester elastomer belt 13, thus lowering the relative extension of the elastomeric belt for a given relative rotation of hub to rim.

Figure 5:
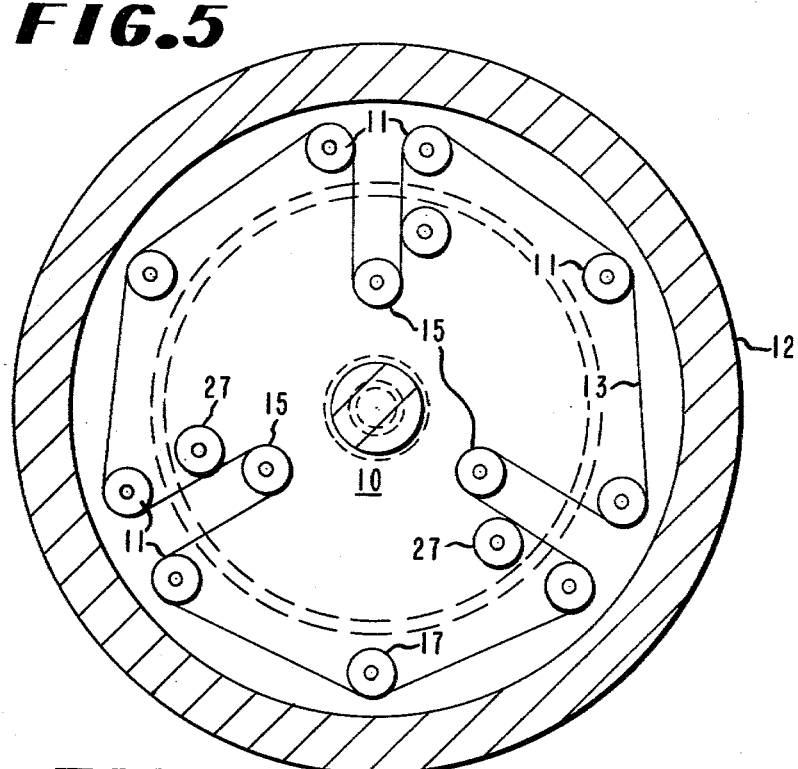

As illustrated in FIG. 5, reverse characteristics of the energy-absorbing torque transmitter can differ from the forward characteristics by means of push rollers 27 mounted on hub member 10 outwardly of hub rollers 15 adjacent or in contact with copolyetherester elastomer belt 13 that joins hub rollers 15 to rim rollers 11. Push rollers 27 are aligned substantially radially with the rim rollers. This provides greater torque in one direction for a given degree of relative motion between rim member and hub member than in the opposite direction. Thus full torque development occurs with fewer degrees of rotation in reverse motion of hub member relative to rim member than is required in the forward motion direction. Guide rollers 17 shown in FIG. 5 serve as do those of FIG. 4, but with the additional purpose of removing the elastomeric belt from possible interference with other rollers.

Figure 3:
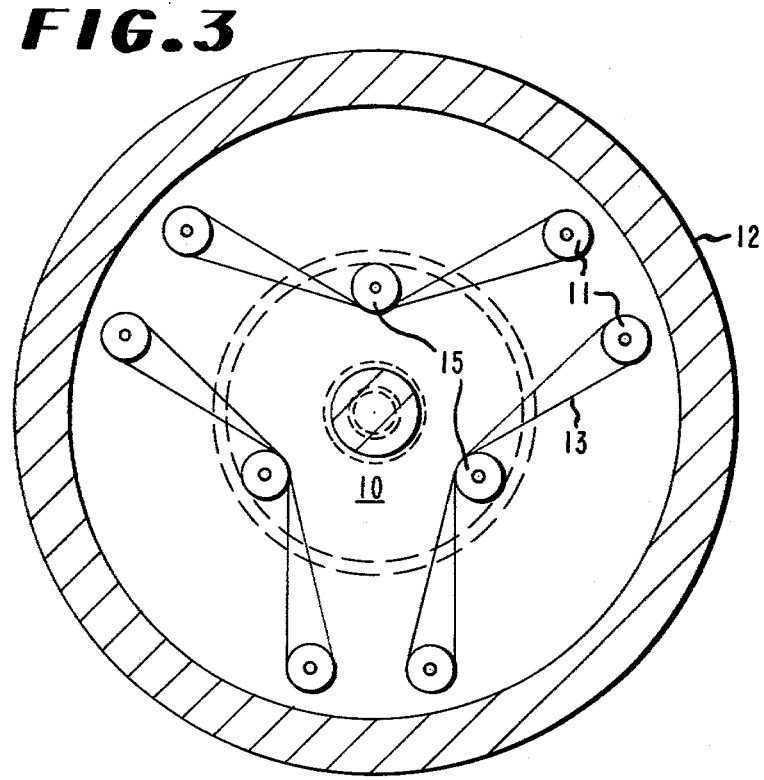

The rim rollers 11 can be placed at various distances along the circumference of the circle they make on rim member 12. The larger the distance between rim rollers 11 of each given pair, as shown in FIG. 3, the softer is its cushioning at low levels of torque. On the other hand, the shorter the distance between rim rollers of each pair, as shown in FIG. 2, the harder is its cushioning at low levels of torque. Usually the two rollers of the pair are separated from each other by about 10°–120°, depending upon the initial softness desired.

The oriented copolyetherester elastomer belt 13 does not deteriorate and retains its elasticity and strength when immersed in transmission fluid at operating temperatures used in an automatic transmission system connecting the drive shaft to the engine shaft. The uniqueness of the oriented copolyetherester elastomeric belt lies in its exceptionally high stress development capability coupled with its potential for excellent recovery from high strains. This means that high forces can be developed with small cross-sections and that high extensions and, therefore, high degrees of rotation (for torque development and softer cushioning) can be achieved with minimal lengths of belt.

The elastomeric belt is made of a polymer that consists essentially of a multiplicity of recurring long-chain and short-chain ester units joined head-to-tail through ester linkages, said long-chain ester units being represented by the structure:

and said short-chain ester units being represented by the structure:

wherein:

G is a divalent radical remaining after removal of terminal hydroxyl groups from poly(alkylene oxide) glycol having a molecular weight between about 400–6000, e.g., poly(tetramethylene oxide) glycol;

R is a divalent radical remaining after removal or carboxyl groups from a dicarboxylic acid having a molecular weight less than about 300, e.g., phthalic, terephthalic or isophthalic acids; and D is a divalent radical remaining after removal of hydroxyl groups from a low molecular weight diol having a molecular weight less than about 250; said short-chain ester units constitute about 15–95% by weight of the copolyetherester and said long-chain ester units constitute the balance.

The copolyetheresters can be made conveniently by a coventional ester interchange reaction. A preferred procedure involves heating the dicarboxylic acid or ester thereof, e.g., dimethyl ester of terephthalic acid, phthalic or isophthalic acid, with a long-chain glycol, e.g., poly(tetramethylene oxide) glycol having a molecular weight of about 600–2000 and a molar excess of diol, e.g., 1,4-butanediol, in the presence of a catalyst at about 150°–260° C. and a pressure of 50–500 kPa, preferably ambient pressure, while distilling off methanol formed by the ester interchange. Thus, preferably, in the above formula G is the group remaining after removal of hydroxyl groups from poly(tetramethylene oxide) glycol having a molecular weight of about 600–2000; R is the group remaining after removal of carboxyl groups from phthalic, terephthalic or isophthalic acids or mixtures thereof, and D is the group remaining after removal of hydroxyl groups from 1,4-butanediol. At least 1.1 mole of diol should be present for each mole of acid, preferably at least about 1.25 mole of diol for each mole of acid. The long-chain glycol should be present in the amount of about 0.0025 to 0.85 mole per mole of dicarboxylic acid, preferably 0.01 to 0.6 mole per mole of acid.

Preferred copolyesters are those prepared from dimethyl terephthalate, 1,4-butanediol, and poly(tetramethylene oxide) glycol having a molecular weight of about 600–1500. Optionally, up to about 30 mole percent and preferably 5–20 mole percent of the dimethyl terephthalate in these polymers can be replaced by dimethyl phthalate or dimethyl isophthalate. Other preferred copolyesters are those prepared from dimethyl terephthalate, 1,4-butanediol, and poly(propylene oxide) glycol having a molecular weight of about 600–1600.

The copolyetherester compositions may also contain up to about 5 weight percent of an antioxidant, e.g., between about 0.2 and 5 weight percent, preferably between about 0.5 and 3 weight percent. The most preferred antioxidants are diaryl amines such as 4,4'-bis-($\alpha,\alpha$-dimethylbenzyl) diphenylamine.

Oriented copolyetherester belts can be formed in a number of ways. For example, the elastomer can be molded in the form of a torus in a conventional manner and the article oriented by stretching, heat setting and cooling. Stretching is accomplished by any convenient means to achieve at least 300% in excess of its original length and preferably at least 400% at a temperature below its melting point by at least 10° C. It is maintained at that length and brought to or maintained at a heat setting temperature between 85° and 10° C. below its melting point. It is then cooled to a temperature below the heat setting temperature by at least 55° C.

Preferably, when the energy-absorbing torque transmitter is used under particularly strenuous conditions and to assure a long working life of the belt, the oriented thermoplastic copolyetherester elastomers belt is composed of two copolyetherester elastomer having different melting points. In such a composite belt, the higher melting point copolyetherester elastomer is in the form of strands, tapes or films which are monoaxially oriented in the direction of their length, or are biaxially oriented, and the lower melting copolyetherester elastomer is bonded thereto in an unoriented form, for example, as a matrix surrounding the individual strand, tapes or films of oriented copolyetherester elastomer. In essence the lower melting elastomer binds the oriented strands, tapes or films into a unitary belt.

Most preferably, the belt is a composite having several layers of oriented copolyetherester elastomer tape substantially alternating with layers of lower melting point unoriented copolyetherester elastomer. Each layer of tape of the higher melting point encapsulated elastomer forms a single, convenient unit for fabricating a composite belt. The composite belt can be made in a number of ways. For example, the two copolyetherester elastomers having melting points differing by at least 20° C. are coextruded into thin tapes, e.g., 0.1–0.5 mm thick. The thin tapes of copolyetherester are oriented by stretching by at least 300% of their original length and then heat-set at a temperature of 85° C.–10° C. below the melting point of the higher melting oriented copolyetherester elastomer. The tape is then wrapped around a mandrel until a sufficient number of layers has been built up to obtain the desired thickness, for example, about 10–30 layers. The article is heated to a temperature above the melting point of the lower melting point copolyetherester elastomer but below the melting point of the higher melting point copolyetherester elastomer by at least about 10° C. The lower melting point copolyetherester becomes fused in the heating step and adheres together adjacent layers of oriented higher melting point copolyetherester. Alternatively, the article can also be heat set during the heat fusion step. The procedure for forming the composite article is further described in U.S. Pat. No. 4,136,715.

The belt can be fabricated from strands of elastomer. For example, an oriented strand of higher melting point copolyetherester elastomer is drawn through a molten bath of lower melting point copolyetherester elastomer at a temperature above the melting point of the lower melting point copolyetherester elastomer but below that of the oriented copolyetherester elastomer. Alternatively, the strand of higher melting point oriented copolyetherester elastomer can be encapsulated by simultaneous extrusion with the lower melting point copolyetherester elastomer and then by stretching the extrudate to orient the copolyetheresters.

A composite belt of copolyetherester elastomer, wherein the oriented elastomer is substantially encapsulated within the unoriented elastomer, can be prepared by laying up the appropriate number of layers of elastomer around end restraints for a belt having the form of a strap, or around a drum for an endless belt. The lay-up is heated to melt the lower melting point encapsulating elastomer without melting the higher melting point oriented core or encapsulated elastomer. The lay-up is cooled to solidify the lower melting point elastomer that bonds the layers together. In the case of a belt that is a strap, external pressure can be applied to the pliedup stack during bonding to assure good melt flow and joining of the bonded layers.

The operation of the energy-absorbing torque transmitter can best be described by reference to FIGS. 1-A and 1-C of the drawing where FIG. 1-A shows the energy-absorbing torque transmitter at rest and FIG. 1-C shows the apparatus when torque is applied. When a clockwise torque is applied to input shaft 16 and hence the rim member 12, the rim rollers 11, which are mounted on rim member 12 move with it, while the hub rollers 15, the hub member 10, to which they are attached, and the output shaft 14 remain at first stationary. Thus relative motion takes place between the rim and hub members with their attached rollers. This necessarily leads to an extension of the elastomer belt 13 (see FIG. 1-C). This lengthening causes a corresponding restoring force in oriented elastomeric belt 13, which in turn is communicated to the hub rollers 15 and thence to hub member 10. This force causes a clockwise torque in the driven or output shaft 14, which increases as the relative motion of the rim member 12 with respect to the hub member 10 continues. Hub member 10 starts to turn when the torque caused by the stretching of oriented elastomeric belt 13 becomes large enough to overcome the initial resisting torque in the output shaft 14. At first it turns more slowly than the input shaft 16 and the relative displacement between the hub and the rim members continues to increase. The ensuing increasing torque causes the rotation of the output shaft 14 to speed up gradually until the torque supplied by the stretching oriented elastomer belt balances the torque caused by the load on the output shaft 14. At this point, the relative motion of the hub and rim members with their attached shafts ceases, and they turn in unison. The two shafts are said to be locked together.

The reverse but entirely equivalent sequence of events takes place when driving power on input shaft 16 is removed. Thus it is that this device permits smooth and gradual starting and stopping but avoids power loss due to slippage at the full rotation speed.

The torque transmitter acts similarly when transitory forces act on the machinery to which it is attached, as for instance, misfires, vibrations, or other sudden shocks. These are immediately compensated for by relative motion of the input and output shafts and, in turn, by corresponding extension or contraction of the oriented elastomer belt. The elastic nature of the latter then permits a gradual shockfree return to the original condition, i.e., "locked" rotation of the input and output shafts.

I claim:

1. In an energy-absorbing torque transmitter comprising a hub member and a rim member, one of which is connected to an output shaft, the other to an input shaft, the hub member having hub means mounted thereon, the rim member of larger diameter having rim means mounted thereon, said hub and rim members being operably connected by at least one belt, the improvement wherein the hub means and rim means are rollers and the number of rim rollers is at least twice the number of hub rollers that are circumferentially arranged around the common axis of hub and rim members and the belt is a composite belt of two copolyetherester elastomers having different melting points trained over hub and rim rollers, the higher melting point copolyetherester elastomer is in the form of strands, tapes or films which are monoaxially oriented in the direction of their length, and the lower melting point copolyetherester elastomer is bonded thereto in an unoriented form as a matrix surrounding the individual strands, tapes or film of oriented copolyetherester elastomer, said belt capable of being stretched by up to about 60% of its original length upon application of force to either shaft to permit relative rotation of said hub member with respect to said rim member so that torque is transferred from one shaft to the other through said belt.

2. An energy-absorbing torque transmitter of claim 1 wherein said oriented copolyetherester belt consists essentially of a multiplicity of recurring long-chain ester units and short-chain ester units joined head-to-tail through ester linkages, said long-chain ester units being represented by the formula

and said short-chain ester units being represented by the formula

where G is a divalent radical remaining after the removal of terminal hydroxyl groups from a poly(alkylene oxide) glycol having a molecular weight of about 400–6000, and R is a divalent radical remaining after removal of carboxyl groups from a dicarboxylic acid having a molecular weight less than about 300, and D is a divalent radical remaining after removal of hydroxyl groups from a diol having a molecular weight of less than about 250; provided said short-chain ester units amount to about 15–95% by weight of said copolyetherester.

3. An energy-absorbing torque transmitter of claim 1 wherein rim and hub members are connected by a single belt of an oriented copolyetherester elastomer trained over said hub and rim rollers.

4. An energy-absorbing torque transmitter of claim 1 wherein said oriented copolyetherester elastomer belt is capable of being stretched from about 5–30% of its original length.

5. An energy-absorbing torque transmitter of claim 2 wherein said copolyetherester belt is derived from terephthalic acid or ester, 1,4-butanediol, and a poly(alkylene oxide) glycol.

6. An energy-absorbing torque transmitter of claim 1 wherein said hub member is an inner rotor with spaced radially disposed walls between which hub rollers are mounted.

7. An energy-absorbing torque transmitter of claim 1 wherein said rim member is an outer rotor with spaced inwardly projecting walls between which rim rollers are mounted.

8. An energy-absorbing torque transmitter of claim 1 wherein a plurality of belts connect hub rollers and rim rollers.

9. An energy-absorbing torque transmitter of claim 1 wherein an endless belt connects hub rollers and rim rollers.

10. An energy-absorbing torque transmitter of claim 1 wherein the rim member has mounted thereon a plurality of guide rollers radially off-set from rim rollers.

11. An energy-absorbing torque transmitter of claim 1 wherein a plurality of push rollers are mounted on the hub member outwardly of hub rollers adjacent to the copolyetherester elastomer belt and aligned substantially radially with rim rollers.

* * * * *